Sept. 4, 1951  J. C. BARKER  2,567,142
WHEEL STRUCTURE
Filed May 31, 1946

INVENTOR.
John C. Barker.
BY
Harness and Harris
ATTORNEYS.

Patented Sept. 4, 1951

2,567,142

UNITED STATES PATENT OFFICE 2,567,142

WHEEL STRUCTURE

John C. Barker, Detroit, Mich., assignor to Chrysler Corporation, Highland Park, Mich., a corporation of Delaware Application May 31, 1946, Serial No. 673,258

4 Claims. (Cl. 301—37)

This invention relates to a motor vehicle wheel structure and more particularly to a means for detachably fastening hub caps to wheels.

The current construction of motor vehicle wheels usually provides an ornamental element or hub cap to cover the wheel mounting bolts. It is essential that this ornamental element be mounted so that it can be easily detached to furnish access to the wheel mounting bolts. In addition, the mounting must be secure to withstand the road shock incident to vehicle operation on bumpy roads.

I have provided a novel combination of a plurality of novel clips, a novel wheel, hub cap and water and dirt shield which cooperate to effect the desired mounting. The means of assembling the clip with the wheel is adapted to predetermine the spring pressure of the clip. In addition, the novel clip is adapted to be formed from round wire at substantial savings in cost over clips formed from flat strip. Furthermore, the means for fastening the clip to the wheel utilizes slots in the wheel so disposed as not materially to reduce the strength of the wheel. Conventional fastening devices for the clip as, for example, screws and rivets have been eliminated.

Figure 1:
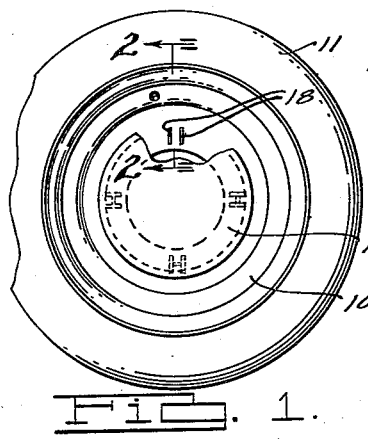
Fig. 1 is an elevational view of a vehicle wheel with a portion of the ornamental cover broken away and one clip removed.
Figure 4:
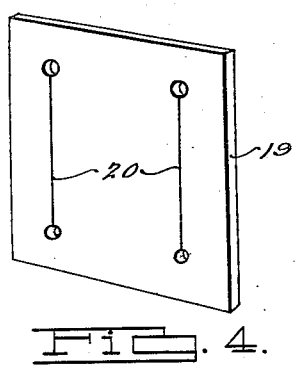
Fig. 4 is a perspective view of the shield.

The vehicle wheel 10 is illustrated with a tire casing 11 and a dished hub cap 12 mounted thereon. The wheel structure includes a disc element 13 and a rim element 14. The rim element 14 receives the tire casing 11 and inner tube 15. The usual valve stem 16 is mounted thereon. The disc element 13 has a central concave portion 17 within which the wheel mounting bolts (not shown) are disposed.

The disc element 13 is provided with a plurality of pairs of slots 18. Each pair of slots 18 is adapted to receive one of my novel clips and comprises parallel individual slots spaced on opposite sides of a wheel radius. The slots are narrow and located sufficiently far from the axis of the wheel so that they do not reduce the strength of the disc materially.

A shield 19 preferably made of rubber is provided with a pair of slits 20 and is fastened to the inner surface of the wheel disc adjacent each pair of slots 18 and the slits 20 are aligned with the slots 18. The shield is used to prevent dirt and water from getting through slots 18 and into the space between the concave portion 17 and the hub cap 12.

Figure 2:
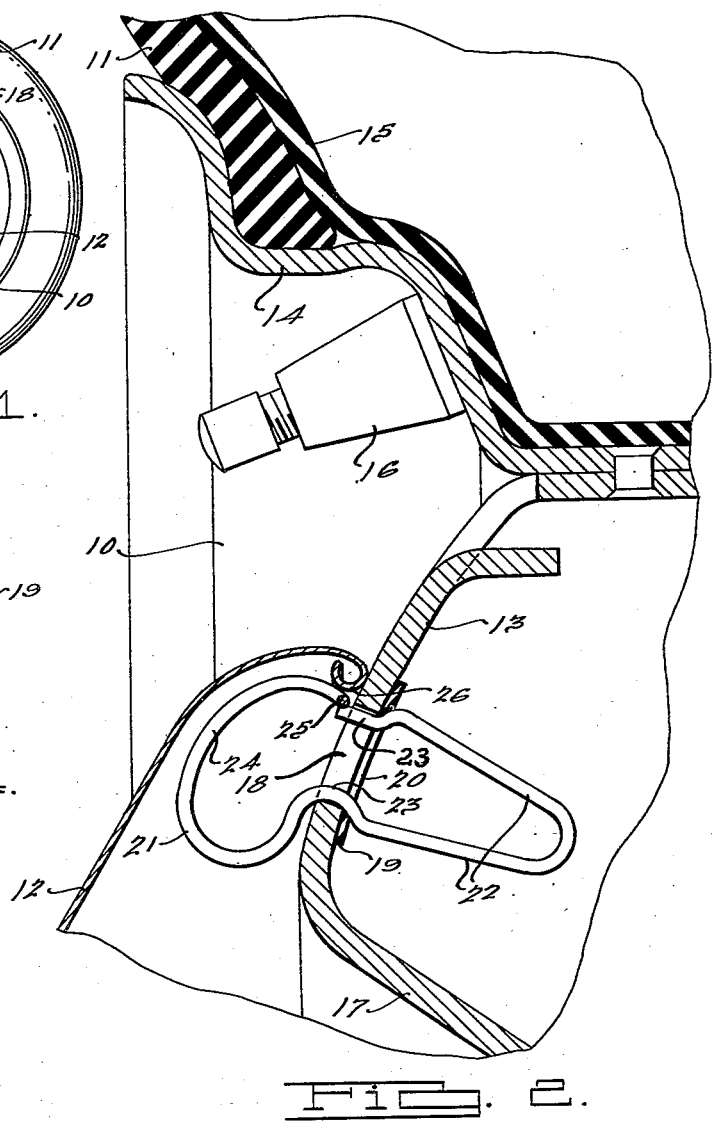
Fig. 2 is a section on the line 2—2 of Fig. 1, with the clip and cover included.
Figure 3:
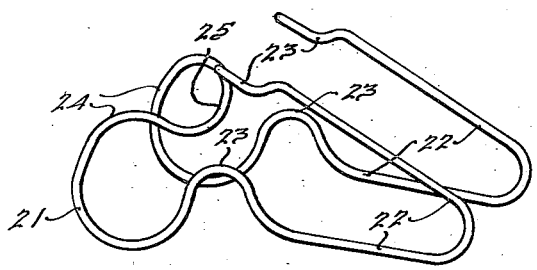
Fig. 3 is a perspective view of the clip.

Each clip 21 is preferably formed from a single strand of round spring wire. The end portions of the wire are aligned and bent back to form a pair of elongated loops or fingers 22 which are adapted to be pushed through slots 18 and slits 20. The wire is preferably of sufficient strength so that insertion through slots 18 will not permanently deform the loops 22. Each loop 22 includes a pair of legs which are provided with a pair of diametrically opposite bent portions 23 which receive the wheel disc element 13 and retain the clip in position. When the clip is not loaded the distance between complementary bent portions is greater than the length of slots 18 so that upon assembly the resiliency of the wire and the bent portions 23 hold the clip in position relative to the wheel disc 13. The central portion of the wire not used in forming the pair of elongated loops is bent into a pair of oblate loops 24 having a connecting element 25 therebetween. The axes of loops 24 are normal to the planes of elongated loops 22. When the clip is assembled on the wheel the loops 24 are disposed outside of the wheel. The hub cap 12 has the peripheral edge thereof rolled inwardly to form a circular bead or annular shoulder 26. When the hub cap or ornamental member 12 is attached to the wheel by the clips the bead 26 is snapped over the resilient loops 24 and retained in position until manually removed. It should be noted that deformation of loop 24 by the hub cap in Figure 2 urges the lower legs of loops 22 into more firm engagement with the bottom of the slots for loop 24 is carried by the lower portion of loops 22.

I claim:

1. In a wheel structure the combination of a wheel disc having an outer and inner surface and having a plurality of pairs of slots therein, each pair of slots comprising two individual narrow slots spaced on opposite sides of and parallel to a wheel radius, a plurality of flexible shield elements each having a pair of slits therein adapted to be aligned with a pair of said slots, said shield elements being attached to the interior surface of said wheel disc, a plurality of clips having a portion thereof protruding beyond the outer surface of said wheel disc, each clip having a pair of flexible extensions thereon adapted to penetrate a pair of said slots and slits and a dished hub cap having portions thereof adapted to engage said clips on the outer surface of said wheel disc thereby to secure said hub cap to said wheel disc and whereby the entrance of water and dirt to the interior of said hub cap through said slots and slits is prevented by said shield elements.

2. In a wheel structure the combination of a wheel disc having an outer and inner surface and having a plurality of slots therein, a plurality of flexible shield elements having slits therein adapted to be aligned with said slots, said shield elements being attached to the interior surface of said wheel disc, a plurality of clips having a portion thereof protruding beyond the outer surface of said wheel disc and resilient portions adapted to penetrate said slots and slits and a dished hub cap having portions thereof adapted to engage said clips on the outer surface of said wheel disc thereby to secure said hub cap to said wheel and whereby the entrance of water and dirt to the interior of said hub cap through said slots and slits is prevented by said shield elements.

3. In a wheel structure the combination of a wheel disc having an outer and inner surface and having a plurality of slots therein, a plurality of flexible shield elements having slits therein adapted to be aligned with said slots, said shield elements being attached to said wheel disc, a plurality of clips having a portion thereof protruding beyond the outer surface of said wheel disc and resilient portions adapted to penetrate said slots and slits and a dished hub cap having portions thereof adapted to engage said clips on the outer surface of said wheel disc thereby to secure said hub cap to said wheel and whereby the entrance of water and dirt to the interior of said hub cap through said slots and slits is prevented by said shield elements.

4. In a wheel structure the combination of a wheel disc having a plurality of pairs of narrow slots therein, each pair of slots comprising two individual narrow slots each having a first end thereof closer to the center of said wheel disc than the other end thereof, a dished hub cap having an annular shoulder around its peripheral edge, a plurality of resilient clips each adapted to be retained in a pair of said slots and to engage said shoulder, each clip comprising a pair of collapsible fingers adapted to be collapsed and projected through a pair of said slots and to thereafter expand to abut said fingers against the ends of said slots, each of said fingers having shoulder portions adapted to abut said disc adjacent the ends of said slots to retain the fingers in position in said slots and each clip having a resilient intermediate portion connecting the portions of said fingers abutting the first end of said slots, said intermediate portion being formed with a shoulder adapted to resiliently grip the annular shoulder of said hub cap.

JOHN C. BARKER.

REFERENCES CITED

The following references are of record in the file of this patent:

UNITED STATES PATENTS

| Number | Name | Date |
|---|---|---|
| 2,196,718 | Ash | Apr. 9, 1940 |
| 2,470,559 | Horn | May 17, 1949 |
| 2,497,896 | Lyon | Feb. 21, 1950 |